United States Patent
Lu

(10) Patent No.: US 10,432,136 B2
(45) Date of Patent: Oct. 1, 2019

(54) INSTALLATION ASSEMBLY FOR PHOTOVOLTAIC MODULE AND METHOD OF USING THE SAME

(71) Applicant: AMBIT MICROSYSTEMS (SHANGHAI) LTD., Shanghai (CN)

(72) Inventor: Kai-Ming Lu, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 80 days.

(21) Appl. No.: 15/697,858

(22) Filed: Sep. 7, 2017

(65) Prior Publication Data

US 2019/0068114 A1     Feb. 28, 2019

(30) Foreign Application Priority Data

Aug. 30, 2017   (CN) ............................ 2017 1 0766456

(51) Int. Cl.
  *H02S 30/10*   (2014.01)
  *H02S 20/20*   (2014.01)

(52) U.S. Cl.
  CPC .............. *H02S 30/10* (2014.12); *H02S 20/20* (2014.12)

(58) Field of Classification Search
  USPC .................................................... 248/222.11
  See application file for complete search history.

(56) References Cited

U.S. PATENT DOCUMENTS

| 7,766,292 | B2 * | 8/2010 | Liebendorfer | H02S 20/23 248/237 |
| 8,316,590 | B2 * | 11/2012 | Cusson | H02S 20/30 52/173.3 |
| 8,839,573 | B2 * | 9/2014 | Cusson | H02S 20/23 52/173.3 |
| 8,925,263 | B2 * | 1/2015 | Haddock | H02S 20/23 52/173.3 |
| 8,938,932 | B1 * | 1/2015 | Wentworth | H02S 20/23 52/747.1 |
| 9,175,881 | B2 * | 11/2015 | Schrock | F16B 9/023 |
| 9,506,600 | B1 * | 11/2016 | Li | H02S 20/00 |
| 9,923,511 | B2 * | 3/2018 | Xie | H02S 30/10 |
| 2010/0276558 | A1 * | 11/2010 | Faust | F24J 2/5205 248/222.14 |

(Continued)

FOREIGN PATENT DOCUMENTS

| CN | 201787280 U | 4/2011 |
| CN | 202189803 U | 4/2012 |

(Continued)

*Primary Examiner* — Monica E Millner
(74) *Attorney, Agent, or Firm* — ScienBiziP, P.C.

(57) ABSTRACT

An installation assembly for a photovoltaic module comprises a base plate, a pressing block, a elastic member, and a connecting member. The base plate comprises a connecting portion. The pressing block comprises a pressing portion, a supporting portion, and a sliding portion. The sliding portion is movably connected to the base plate. The elastic member is located between the connecting portion and the supporting portion. The connecting member sequentially inserted into the pressing block, the elastic member, and the base plate. The pressing block, the elastic member, and the base plate are positioned between two ends of the connecting member.

18 Claims, 7 Drawing Sheets

100

(56) References Cited

U.S. PATENT DOCUMENTS

| | | | | |
|---|---|---|---|---|
| 2011/0072631 A1* | 3/2011 | Hartelius | ............... | F24S 25/12 |
| | | | | 29/428 |
| 2015/0249423 A1* | 9/2015 | Braunstein | .............. | H02S 20/23 |
| | | | | 52/173.3 |
| 2016/0204732 A1* | 7/2016 | Thomas | .................. | F24S 40/80 |
| | | | | 248/201 |
| 2017/0104442 A1* | 4/2017 | MacRostie | ............. | H02S 20/23 |
| 2017/0302222 A1* | 10/2017 | Aliabadi | ................ | H02S 20/23 |

FOREIGN PATENT DOCUMENTS

| | | |
|---|---|---|
| CN | 202585446 U | 12/2012 |
| CN | 203553180 U | 4/2014 |
| CN | 203562992 U | 4/2014 |
| CN | 203883742 U | 10/2014 |
| CN | 205142081 U | 4/2016 |
| CN | 102347386 B | 9/2016 |
| DE | 202004015761 U1 | 1/2005 |
| TW | I568981 | 2/2017 |

\* cited by examiner

INSTALLATION ASSEMBLY FOR PHOTOVOLTAIC MODULE AND METHOD OF USING THE SAME

FIELD

The subject matter relates to an installation assembly for a photovoltaic module, also relates to a method of using the installation assembly for the photovoltaic module.

BACKGROUND

Photovoltaic modules usually include photovoltaic frames. The photovoltaic frame is usually fixed by a pressing block. However, the pressing block, a connecting member, and a fastener are separated from one another. It needs on-site assembly, thereby increasing the installation time of the frame of photovoltaic device.

BRIEF DESCRIPTION OF THE DRAWINGS

Implementations of the present disclosure will now be described, by way of example only, with reference to the attached figure.

DETAILED DESCRIPTION

Figure 1:
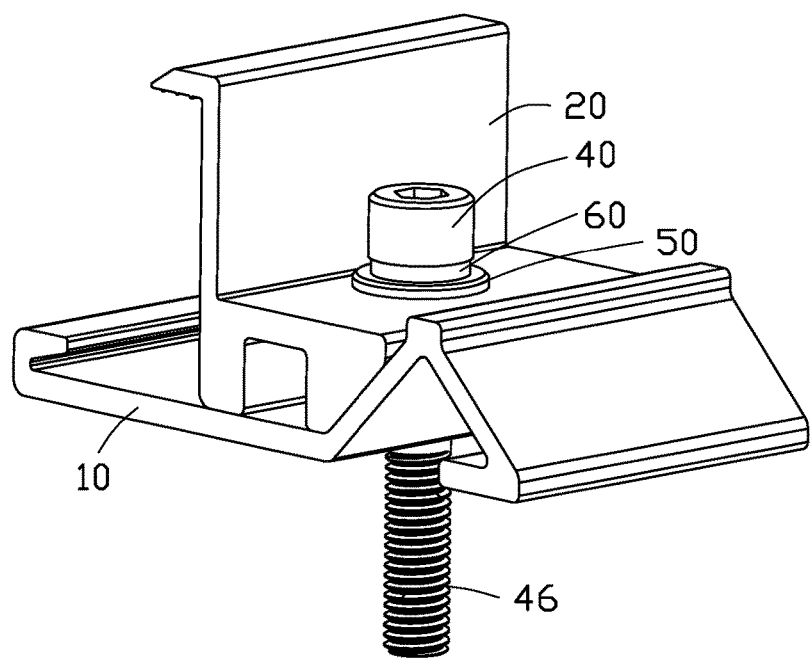
FIG. 1 is an isometric view of an installation assembly for a photovoltaic module, of an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details.

In other instances, methods, procedures, and members have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

Definitions that apply throughout this disclosure will now be presented.

The term "substantially" is defined to be essentially conforming to the particular dimension, shape, or other feature that the term modifies, such that the member need not be exact. For example, "substantially rectangular" means that the object resembles a rectangle, but can have one or more deviations from a true rectangle.

The term "comprising," when utilized, means "including, but not necessarily limited to"; it specifically indicates open-ended inclusion or membership in the so-described combination, assembly, series, and the like.

Figure 2:
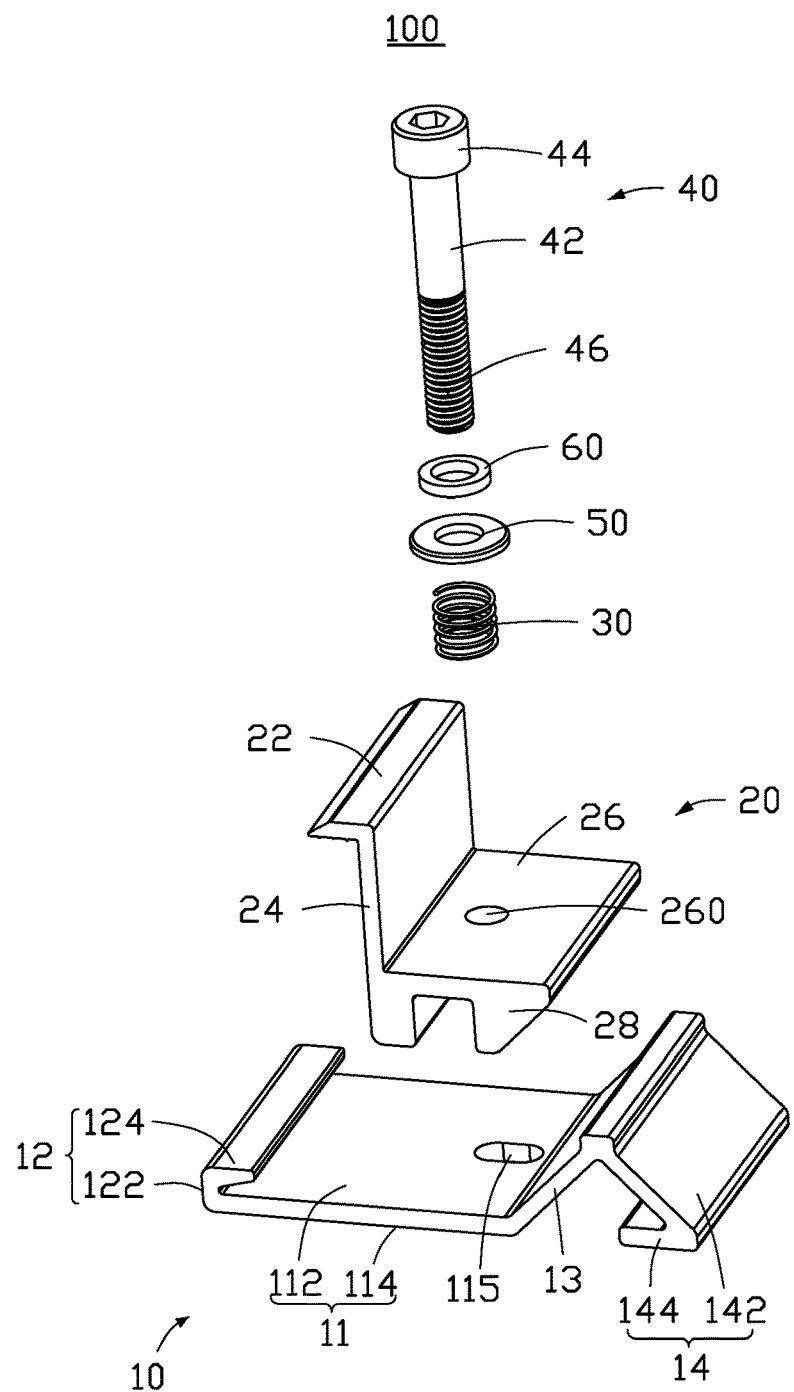
FIG. 2 is an exploded diagram of the installation assembly for a photovoltaic module of FIG. 1.

Referring to FIGS. 1 to 2, the installation assembly 100 for a photovoltaic module comprises a base plate 10, a pressing block 20, an elastic member 30, a connecting member 40, a flat pad 50, and an elastic pad 60.

The pressing block 20 is positioned on the base plate 10. The elastic member 30 is located between the base plate 10 and the pressing block 20, and abuts the base plate 10 and the pressing block 20. The connecting member 40 passes through the pressing block 20, the elastic member 30, and the base plate 10. The flat pad 50 and the elastic pad 60 are disposed between the pressing block 20 and the connecting member 40. The flat pad 50 is positioned on the pressing block 20. The elastic pad 60 is positioned on the flat pad 50.

The base plate 10 comprises a connecting portion 11, a fixing portion 12, and an inclined portion 13. The fixing portion 12 and the inclined portion 13 are positioned at opposite ends of the connecting portion 11. In the exemplary embodiment, the connecting portion 11 is substantially rectangular. The fixing portion 12 and the inclined portion 13 are located on a same surface of the connecting portion 11.

The connecting portion 11 comprises an upper surface 112 and a lower surface 114. The upper surface 112 is parallel to the lower surface 114. The fixing portion 12 is perpendicular to the upper surface 112 and extends from the upper surface 112. The inclined portion 13 is inclined relative to the fixing portion 12 and extends from the upper surface 112 along a direction away from the fixing portion 12. A first through hole 115 is defined in the connecting portion 11. The first through hole 115 is adjacent to the inclined portion 13. The first through hole 115 extends through the upper surface 112 and the lower surface 114.

In the exemplary embodiment, the fixing portion 12 comprises a first part 122 and a second part 124. The first part 122 is perpendicular to the second part 124. The first part 122 is perpendicularly connected to the connecting portion 11. The second part 124 is perpendicularly connected to the first part 122. The second part 124 is parallel to the connecting portion 11 and extends towards the inclined portion 13.

In other exemplary embodiments, the fixing portion 12 can comprise only the first part 122.

The base plate 10 can also comprise a leg 14. The leg 14 is connected to the inclined portion 13. The leg 14 and the connecting portion 11 are located on opposite ends of the inclined portion 13. A bottom of the leg 14 and the connecting portion 11 are located on the same plane. The leg 14 supports the inclined portion 13 to maintain stability of the inclined portion 13. The leg 14 and the inclined portion 13 cooperatively form a V-shaped support. The leg 14 and the inclined portion 13 are two bevel edges of the V-shaped support.

In the exemplary embodiment, the leg 14 comprises an oblique section 142 and a horizontal section 144. The oblique section 142 connects the inclined portion 13, and the horizontal section 144 connects the oblique section 142. The horizontal section 144 and the connecting portion 11 are located on the same plane. In the exemplary embodiment, the horizontal section 144 extends towards the inclined portion 13.

The pressing block 20 is substantially the shape of lower case "h". The pressing block 20 comprises a pressing portion 22, a resting portion 24, a supporting portion 26, and a sliding portion 28. The resting portion 24 is substantially a rectangular plate. The resting portion 24 is perpendicular to the connecting portion 11. The resting portion 24 can be used to support a frame (not shown) of the photovoltaic module. The pressing portion 22 and the supporting portion 26 are located on opposite sides of the resting portion 24. The pressing portion 22 is located at one end of the resting portion 24 and perpendicular to the resting portion 24. The pressing portion 22 extends towards the fixing portion 12. The supporting portion 26 is located adjacent to the other end of the resting portion 24. The supporting portion 26 is perpendicular to the resting portion 24. The sliding portion 28 is positioned at an end of the supporting portion 26 and inclined towards the resting portion 24. In the exemplary embodiment, the sliding portion 28 is disposed on the inclined portion 13. The sliding portion 28 can slide on the inclined portion 13. In other exemplary embodiment, sawteeth (not shown) are positioned on a contacting surface of the sliding portion 28 and the inclined portion 13. The sliding portion 28 slides on the inclined portion 13 through the engagement between the plurality of sawteeth. A second through hole 260 is defined in the supporting portion 26. The second through hole 260 corresponds to and is aligned with the first through hole 115. The diameter of the second through hole 260 is larger than the diameter of the first through hole 115.

The angle between the sliding portion 28 and the supporting portion 26 is substantially equal to the angle between the inclined portion 13 and the connecting portion 11. Thus, the supporting portion 26 maintains its parallel state in relation to the connecting portion 11 when the sliding portion 28 slides on and the inclined portion 13.

The elastic member 30 is located between the connecting portion 11 and the supporting portion 26. The resting portion 24 and the sliding portion 28 are located on opposite sides of the elastic member 30. The elastic member 30 corresponds to and is aligned with the first through hole 115 and the second through hole 260. The diameter of the elastic member 30 is larger than the diameter of the second through hole 260. In the exemplary embodiment, the elastic member 30 is a spring.

The connecting member 40 is substantially cylindrical. One end of the connecting member 40 is engaged with the pressing block 20, and the other is positioned at the side of the base plate 10 away from the pressing block 20. When the elastic member 30 is compressed, the other end of the connecting member 40 is moved away from the pressing block 20.

In the exemplary embodiment, the connecting member 40 is a screw bolt. The connecting member 40 comprises a screw stud 42 and a screw nut 44. The screw stud 42 is connected to the screw nut 44. The screw nut 44 is located at one end of the screw stud 42. The diameter of the screw nut 44 is greater than the diameter of the screw stud 42. The diameter of the screw stud 42 is smaller than the diameter of the first through hole 115. The diameter of the screw nut 44 is larger than the diameter of the second through hole 260. The connecting member 40 matches with the second through hole 260 and the first through hole 115, and sequentially passes through the pressing block 20, the elastic member 30, and the base plate 10. The connecting member 40 also comprises a threaded portion 46. The threaded portion 46 is located on the outer surface of the lower half of the screw stud 42. The diameter of the threaded portion 46 is smaller than the diameter of the first through hole 115. The base plate 10, the pressing block 20, and the elastic member 30 are located between the screw nut 44 and the threaded portion 46.

The flat pad 50 is an annular cylindrical washer. The flat pad 50 is located between the screw nut 44 and the supporting portion 26. The screw stud 42 passes through the flat pad 50. The inner diameter of the flat pad 50 is larger than the diameter of the screw stud 42 and is smaller than the diameter of the screw nut. The outer diameter of the flat pad 50 is larger than the diameter of the screw nut 44. The flat pad 50 increases the contact area between the connecting member 40 and the installation assembly 100.

The elastic pad 60 is substantially annular cylindrical. The elastic pad 60 is located between the flat pad 50 and the screw nut 44. The screw stud 42 passes through the elastic pad 60. The inner diameter of the elastic pad 60 is larger than the diameter of the screw stud 42 and is smaller than the diameter of the screw nut 44. The outer diameter of the elastic pad 60 is larger than the diameter of the screw nut 44 and smaller than the outer diameter of the flat pad 50. The elastic pad 60 prevents the connecting member 40 from being loosened, and gives a buffering protection when the connecting member 40 is subjected to an external force.

When assembled, the elastic pad 60 and the flat pad 50 are first inserted into the connecting member 40. The pressing block 20, the elastic member 30, and the base plate 10 are sequentially inserted into the connecting member 40. The position of the pressing block 20 with respect to the base plate 10 is adjusted to attach the sliding portion 28 to the inclined portion 13.

When in use, the installation assembly 100 is pre-locked on a base (not shown). The base is a support member having a horizontal platform. The photovoltaic frame is placed on the upper surface 112 of the connecting portion 11, with one surface of the photovoltaic frame being placed on the resting portion 24. The connecting member 40 is rotated downwardly until the photovoltaic module frame is fixed to the fixing portion 12, thereby locking the photovoltaic frame to the installation assembly.

The installation assembly 100 comprises the base plate 10, the pressing block 20, the elastic member 30, and the connecting member 40. The connecting member 40 comprises a screw stud 42, a screw nut 44, and a threaded portion 46. The threaded portion 46 is located on the outer surface of the lower half of the screw stud 42. The base plate 10, the pressing block 20, and the elastic member 30 are located between the screw nut 44 and the threaded portion 46, to save the installation time required.

Referring to FIGS. 3 to 7, a method of using the installation assembly 100 of the exemplary embodiment is provided.

Figure 4:
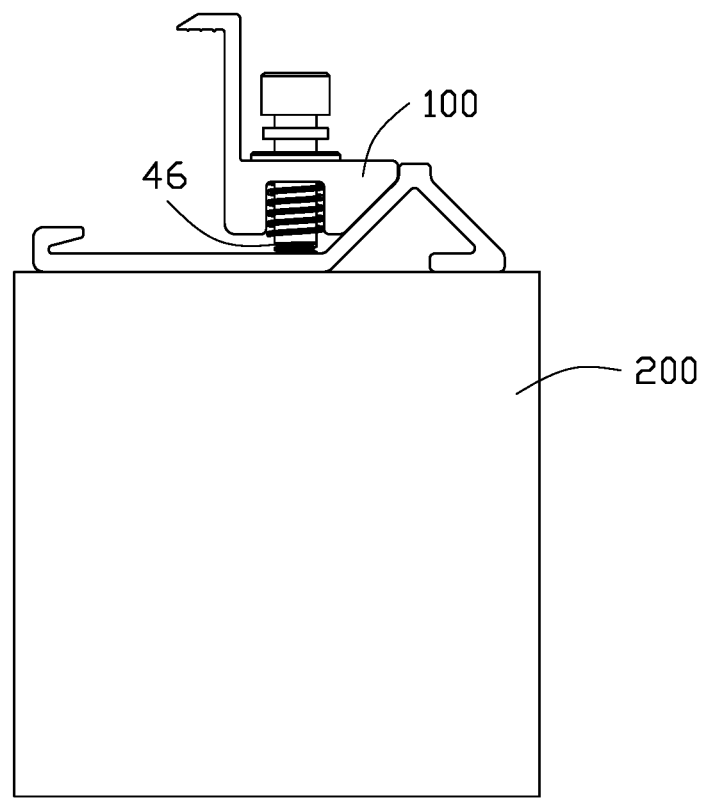
FIG. 4 is a plan diagram of the installation assembly for a photovoltaic module pre-locking on a base.

Referring to FIG. 4, a base 200 and the installation assembly 100 are provided, the installation assembly 100 is pre-locked on the base 200.

In the exemplary embodiment, a groove (not shown) is defined in the base 200. The inner wall of the groove has a plurality of internal threads (not shown). The threaded portion 46 is engaged with the plurality of internal threads to fix the screw stud 42 to the base 200.

In other exemplary embodiment, a recess is defined in the base 200. A nut is fixed in the groove. The nut has a plurality of internal threads. The threaded portion 46 is engaged with the plurality of internal threads to fix the screw stud 42 to the base 200.

Figure 3:
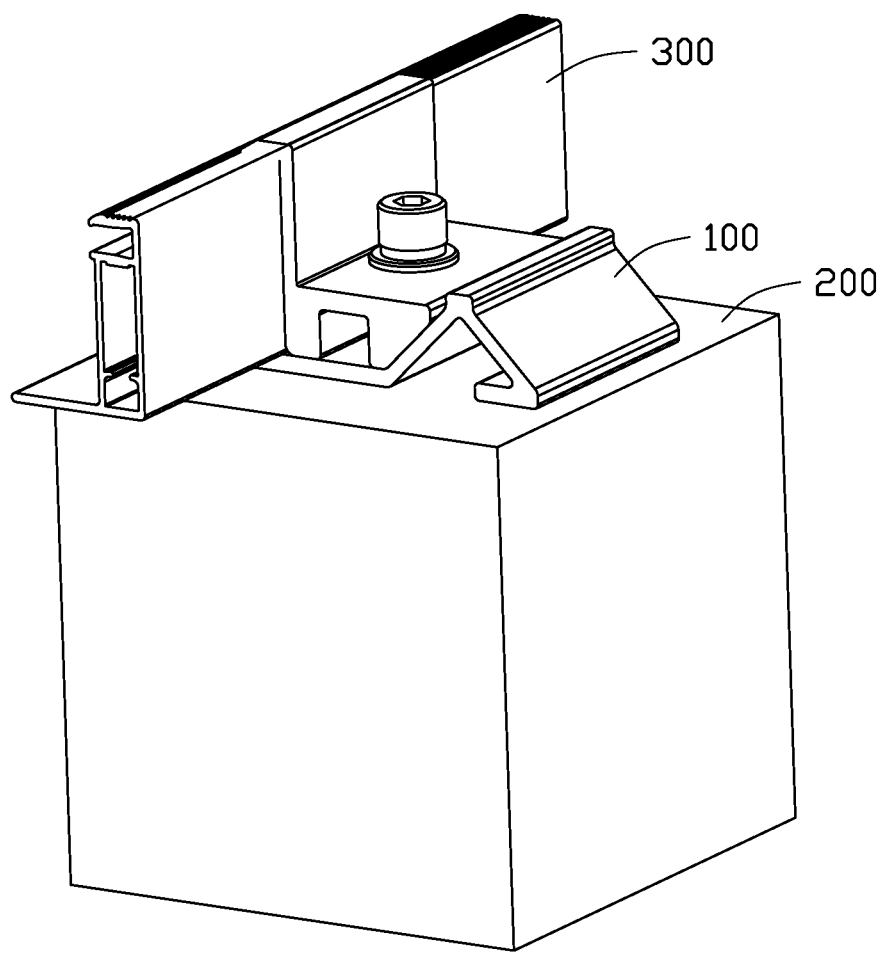
FIG. 3 is an isometric view of a base fixed on the installation assembly for a photovoltaic module of FIG. 1 of an exemplary embodiment.
Figure 5:
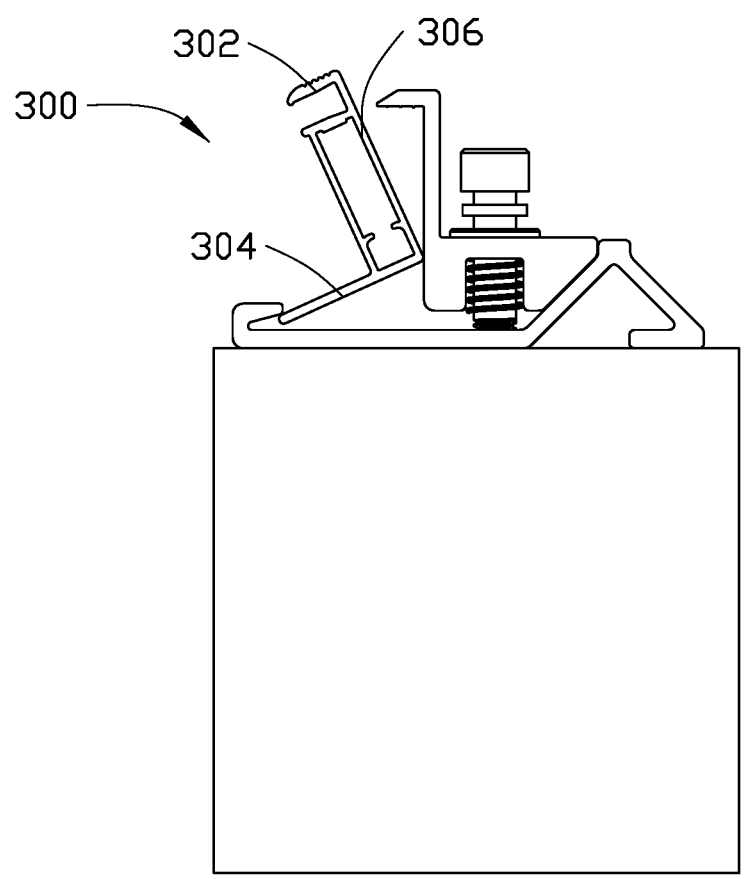
FIG. 5 is a plan diagram of a photovoltaic module frame not mounted on the installation assembly for a photovoltaic module.
Figure 6:
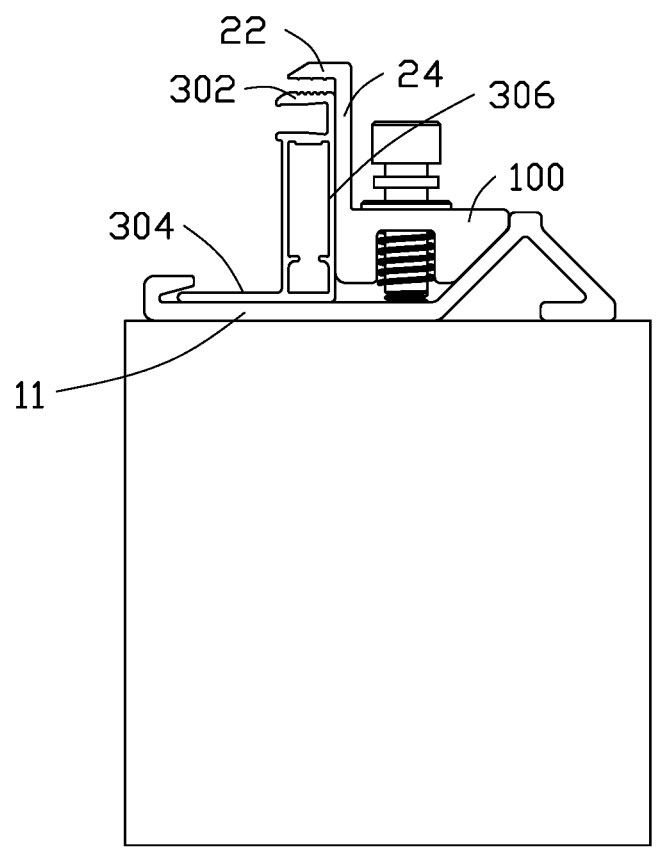
FIG. 6 is a plan diagram of the photovoltaic module frame positioned on the installation assembly for a photovoltaic module.

Referring to FIGS. 3, 5, and 6, a photovoltaic module frame 300 is provided. The photovoltaic module frame 300 is embedded into the installation assembly 100.

The photovoltaic module frame 300 comprises an upper frame 302, a lower frame 304, and a side frame 306. The upper frame 302 is parallel to the lower frame 304. The side frame 306 is perpendicularly connected to the upper frame 302 and the lower frame 304.

Referring to FIG. 6, the photovoltaic module frame 300 is placed on the installation assembly 100. At this time, the lower frame 304 is positioned on the connecting portion 11. The side frame 306 is attached to the resting portion 24, and is perpendicular to the connecting portion 11, and the pressing portion 22 is located directly above the upper frame 302 and is parallel to the upper frame 302.

Figure 7:
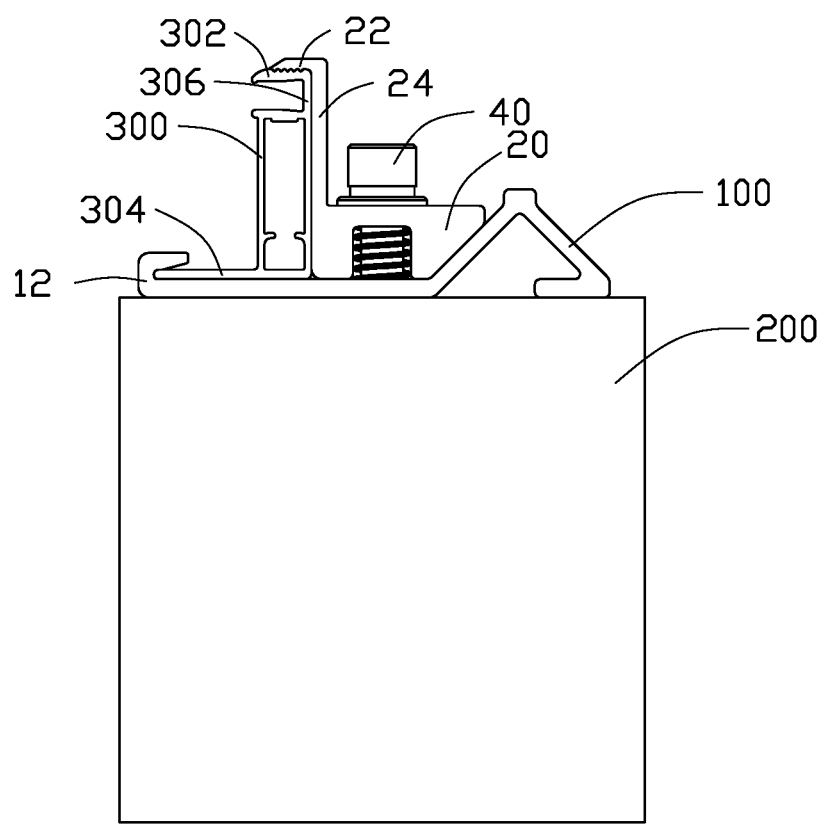
FIG. 7 is a plan diagram of the photovoltaic module frame mounted on the installation assembly for a photovoltaic module.

Referring to FIGS. 3 and 7, the connecting member 40 is tightened to fix the photovoltaic module frame 300 to the installation assembly 100.

During the locking of the connecting member 40, the pressing block 20 is inclined downwardly along the inclined portion 13 to engage the end portion of the lower frame 304 with the fixing portion 12. The side frame 306 abuts against the resting portion 24 and the upper frame 302 is pressed and fixed by the pressing portion 22, to complete the mounting of the photovoltaic module frame 300.

The embodiment shown and described above is only an example. Many other details are often found in the art and many of such details are neither shown nor described. Even though numerous characteristics and advantages of the present disclosure have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An installation assembly for a photovoltaic module, the installation assembly comprising:
   a base plate comprising a connecting portion, a fixing portion, an inclined portion, and a leg;
   a pressing block comprising a pressing portion, a supporting portion, and a sliding portion, the sliding portion movably connected to the base plate;
   an elastic member located between the connecting portion and the supporting portion; and
   a connecting member sequentially passing through the pressing block, the elastic member, and the base plate, the pressing block, the elastic member, and the base plate positioned between two ends of the connecting member; and
   wherein the fixing portion and the inclined portion are positioned at opposite ends of the connecting portion, the leg and the connecting portion are located at opposite ends of the inclined portion, and a bottom of the leg and the connecting portion are located on a same plane.

2. The installation assembly of claim 1, wherein the fixing portion is perpendicular to the connecting portion, and extends from the connecting portion, the inclined portion is inclined relative to the fixing portion, and extends from the connecting portion away from the fixing portion.

3. The installation assembly of claim 2, wherein the pressing block comprises an resting portion, the resting portion is perpendicular to the connecting portion, the pressing portion and the supporting portion are located on opposite sides of the resting portion, the pressing portion is located at one end of the resting portion and perpendicular to the resting portion, the supporting portion is located at the other end of the resting portion, the supporting portion is perpendicular to the resting portion, the sliding portion is positioned at an end of the supporting portion and inclined towards the resting portion.

4. The installation assembly of claim 3, wherein a first through hole is defined in the connecting portion, the first through hole is adjacent to the inclined portion, a second through hole is defined in the supporting portion, the second through hole corresponds to the first through hole.

5. The installation assembly of claim 4, wherein the connecting member passes through the pressing block, the elastic member, and the base plate through the second through hole and the first through hole.

6. The installation assembly of claim 4, wherein a diameter of the elastic member is larger than a diameter of the second through hole.

7. The installation assembly of claim 2, wherein the fixing portion comprises a first part and a second part, the first part is perpendicular to the second part, the first part is perpendicularly connected to the connecting portion, the second part is perpendicularly connected to the first part, the second part is parallel to the connecting portion and extends towards the inclined portion.

8. The installation assembly of claim 2, wherein the leg comprises an oblique section and a horizontal section, the oblique section connects the inclined portion, and the horizontal section connects the oblique section, the horizontal section and the connecting portion are located on a same plane.

9. The installation assembly of claim 1, wherein the connecting member is cylindrical, the connecting member is fixed at one end to the pressing block, and a threaded portion is located on an outer surface of another end of the connecting member.

10. A method of using an installation assembly for a photovoltaic module, the method comprising:
   providing a base and the installation assembly for photovoltaic module, the installation assembly for photovoltaic module comprising a base plate, a pressing block, a elastic member, and a connecting member, the base plate comprising a connecting portion, a fixing portion, an inclined portion, and a leg, the pressing block comprising a pressing portion, a supporting portion, and a sliding portion, the sliding portion movably connected to the base plate, the elastic member located between the connecting portion and the supporting portion, the connecting member sequentially passing through the pressing block, the elastic member, and the base plate, the pressing block, the elastic member, and the base plate positioned between two ends of the connecting member, wherein the fixing portion and the inclined portion are positioned at opposite ends of the connecting portion, the leg and the connecting portion are located at opposite ends of the inclined portion, and a bottom of the leg and the connecting portion are located on a same plane;
   providing a photovoltaic module frame, embedding the photovoltaic module frame into the installation assembly for photovoltaic module;
   tightening the connecting member to fix the photovoltaic module frame to the installation assembly for photovoltaic module.

11. The method of claim 10, wherein the fixing portion is perpendicular to the connecting portion, and extends from the connecting portion, the inclined portion is inclined relative to the fixing portion, and extends from the connecting portion away from the fixing portion.

12. The method of claim 11, wherein the pressing block comprises an resting portion, the resting portion is perpendicular to the connecting portion, the pressing portion and the supporting portion are located on opposite sides of the resting portion, the pressing portion is located at one end of the resting portion and perpendicular to the resting portion, the supporting portion is located at the other end of the resting portion, the supporting portion is perpendicular to the resting portion, the sliding portion is positioned at an end of the supporting portion and inclined towards the resting portion.

13. The method of claim 12, wherein a first through hole is defined in the connecting portion, the first through hole is adjacent to the inclined portion, a second through hole is defined in the supporting portion, the second through hole corresponds to the first through hole.

14. The method of claim 13, wherein the connecting member passes through the pressing block, the elastic member, and the base plate through the second through hole and the first through hole.

15. The method of claim 13, wherein a diameter of the elastic member is larger than a diameter of the second through hole.

16. The method of claim 11, wherein the fixing portion comprises a first part and a second part, the first part is perpendicular to the second part, the first part is perpendicularly connected to the connecting portion, the second part is perpendicularly connected to the first part, the second part is parallel to the connecting portion and extends towards the inclined portion.

17. The method of claim 11, wherein the leg comprises an oblique section and a horizontal section, the oblique section connects the inclined portion, and the horizontal section connects the oblique section, the horizontal section and the connecting portion are located on a same plane.

18. The method of claim 10, wherein the connecting member is cylindrical, the connecting member is fixed at one end to the pressing block, and a thread portion is located on an outer surface of another end of the connecting member.

* * * * *